March 26, 1935.  J. SUNNEN  1,995,368
METHOD OF FABRICATING STRUCTURAL MEMBERS
Filed May 15, 1933
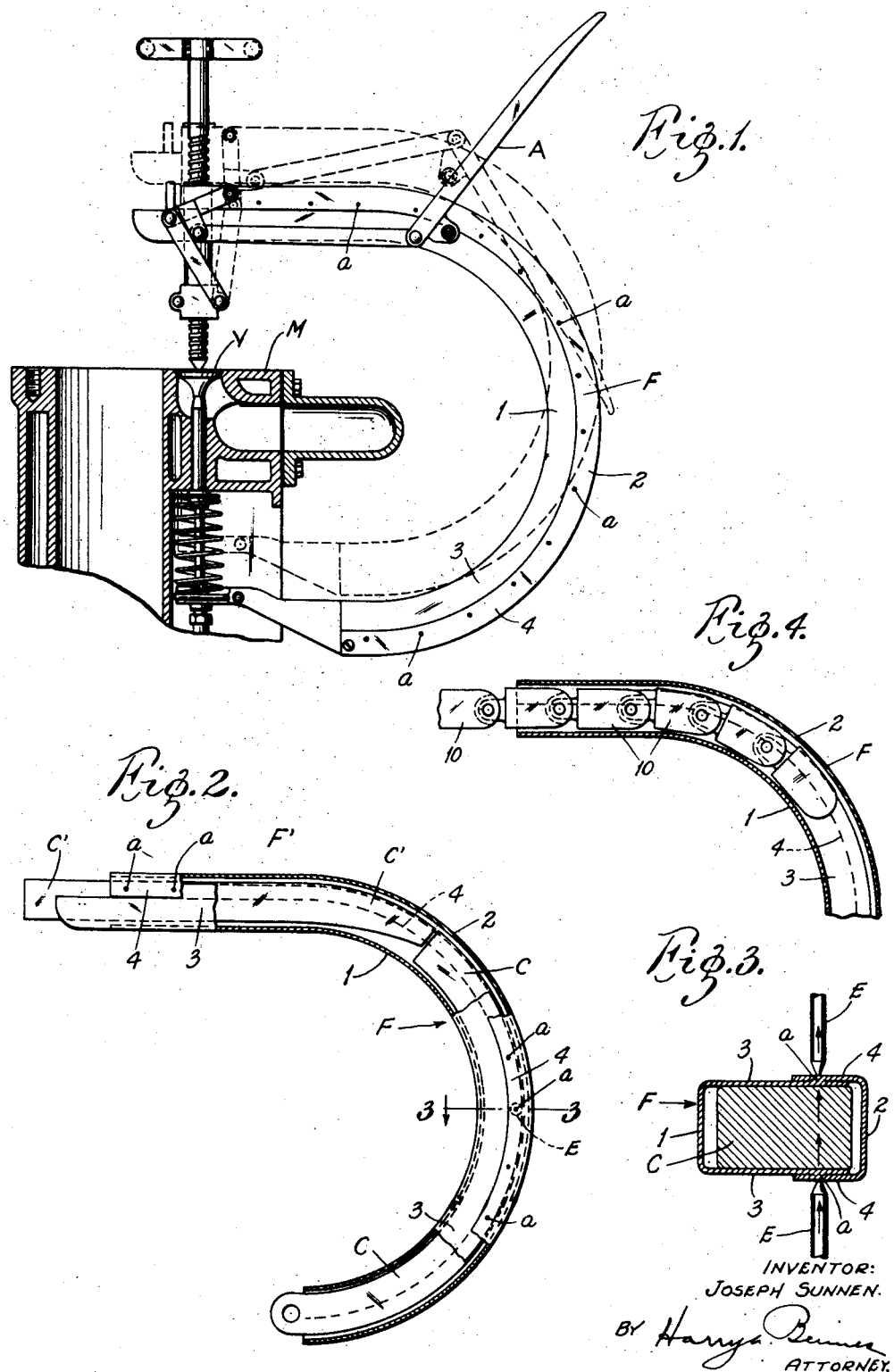
INVENTOR:
JOSEPH SUNNEN.
BY Harry... 
ATTORNEY.

Patented Mar. 26, 1935

1,995,368

UNITED STATES PATENT OFFICE 1,995,368

METHOD OF FABRICATING STRUCTURAL MEMBERS

Joseph Sunnen, Kirkwood, Mo.

Application May 15, 1933, Serial No. 671,089

4 Claims. (Cl. 219—10)

My invention has relation to improvements in structural members and methods of fabricating them, and it consists in the novel features more fully set forth in the specification and pointed out in the claims.

The invention is more particularly directed to structural members which are hollow and of arcuate shape and are adapted to serve in the construction of the frame of special tools although not limited to such use.

The object of the invention is to construct an arcuate structural member that will combine great strength with light weight. A further object of the invention is to provide a method whereby such member may be made that insures a mechanically perfect job; i. e., there will be no defects of construction in the member. A still further object of the invention is to provide a method for fabricating a structural member of the character above pointed out that is simple and involves a comparatively low manufacturing cost.

Further and other advantages will be better apparent from a detailed description of the invention in connection with the accompanying drawing, in which:

Figure 1 is a side elevation of a tool embodying a structural member made according to the invention, said tool being applied to an automobile engine, part of which is shown in section; Fig. 2 is a combined side elevation and middle, longitudinal section of a structural member in the process of being fabricated; Fig. 3 is a cross-sectional detail on an enlarged scale taken on the line 3—3 of Fig. 2; and Fig. 4 shows a modified form of core used in my improved method of fabricating.

Referring to the drawing, M represents a motor block and A a valve lifter applied thereto for the purpose of removing the valve V in a manner well known in the art. The valve lifter A comprises a frame F shaped in the form of the letter C, said frame having a cross-section of a hollow rectangle. The specific construction of the frame and the method whereby the frame is fabricated is the subject-matter of the present application. No claims are herein made to the valve lifter as this has been specifically claimed in a separate application filed of even date herewith. It will be observed that said frame F is arcuate, or formed in the shape of the letter C, and at the same time is a hollow rectangle in cross-section. While it is possible to form the frame in some other cross-sectional shape I have found that the rectangular shape is desirable as it more readily accommodates itself to the other parts assembled with the frame in constructing a valve lifter. The frame F is formed of two channel-shaped components 1 and 2, the sides 3, 3 of the inner component 1 and the sides 4, 4 of the outer component 2 being in contacting overlapping relation (Fig. 3). The components 1 and 2 are spot-welded together from one end of the frame to the other at substantially evenly spaced points $a$, $a$, etc., as shown (Figs. 2 and 3).

It is obvious, that it would be impossible from a practical standpoint to spot-weld the sides 3 and 4 on each side of the frame F independently because an electrode would have to be introduced into the hollow frame to accomplish this result. I have solved this difficulty by inserting into the frame a core C of copper or other material having high electrical conductivity and then applying the electrodes E, E to the opposite sides of the frame at the points that are to be spot-welded, the application of said electrodes being accompanied by sufficient pressure to cause the inner surface of the sides 3, 3 of component 1 to contact with the core C. A current of the required voltage and amperage is then caused to traverse the electrodes, and of course the core C and sides 3 and 4, at the points $a$, $a$ whereupon said sides will be effectively welded at these points. The frame F is formed along a true circular arc so that the core C also formed along a true circular arc may be positioned within the assembled components 1 and 2 and after the welding operation is performed may also be easily removed from the frame F. Obviously, the short portion F' of the frame that is rectilinear will have a substantially rectilinear core C' inserted in it. In order to facilitate the insertion and removal of the core C it is formed somewhat shorter than the length of the arc of the frame and the core C' terminates in a slightly arcuate portion to accommodate the balance of the arc of the frame F as shown (Fig. 2). Obviously, this is a matter of convenience and the length of the cores C and C' may be varied in any manner so long as they will extend throughout the full length of the assembled components 1 and 2.

If desired, instead of having a curved core, such as C, the core may be constructed of a series of connecting links 10, 10, etc., as shown in Fig. 4. The flexibility of the link core will readily permit its removal from the frame F after the components 1 and 2 thereof have been welded together.

Having described my invention, I claim:

1. The method of fabricating a curved structural member which comprises arranging a series of cores of high electrical conductivity in flexible, connected relation, assembling over said cores a plurality of elements of angular shape, arranging said elements with their sides in overlapping relation to form a tube and opposite sides having electrical connection with said core, applying electrodes of a spot-welder to the outer surfaces of said opposite sides, causing a suitable current of electricity to pass through said electrodes whereby the elements become welded together, and finally withdrawing the series of cores from the structural member formed.

2. The method of fabricating an arcuate structural member which comprises fashioning an arcuate core of high electrical conductivity, assembling over said core a plurality of elements of arcuate shape to fit the core and in peripheral overlapping relation, effecting electrical connection between said core and the overlapping parts of the elements, applying electrodes of a spot-welder to the overlapping parts of the elements, and causing a suitable current of electricity to pass through said electrodes whereby the elements become welded together, and removing said core from the structural member formed.

3. The method of fabricating an arcuate structural member which comprises fashioning a flexible arcuate core of high electrical conductivity, assembling over said core a plurality of elements of arcuate shape to fit the core and in peripheral overlapping relation, effecting electrical connection between said core and the overlapping parts of the elements, applying electrodes of a spot-welder to the overlapping parts of the elements, causing a suitable current of electricity to pass through said electrodes whereby the elements become welded together, and removing the core from the structural member formed.

4. The method of fabricating a curved structural member which comprises assembling over a series of connected cores of high electrical conductivity a plurality of arcuate channel-shaped elements, arranging said elements with opposite sides in overlapping relation to form a tube of rectangular cross-section and the inner sides in contacting relation with said cores, applying electrodes of a spot-welder to the outer surfaces of said opposite sides, causing a suitable current of electricity to pass through said electrodes whereby the elements become welded together, and removing the cores from the structural member formed.

JOSEPH SUNNEN.